(12) United States Patent
Lee et al.

(10) Patent No.: US 11,189,184 B2
(45) Date of Patent: Nov. 30, 2021

(54) DISPLAY APPARATUS AND CONTROLLING METHOD THEREOF

(71) Applicant: SAMSUNG ELECTRONICS CO., LTD., Suwon-si (KR)

(72) Inventors: Dai-boong Lee, Hwaseong-si (KR); Jeong-wook Bang, Yongin-si (KR); So-yeon Hwang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/277,239

(22) Filed: Feb. 15, 2019

(65) Prior Publication Data

US 2019/0180638 A1 Jun. 13, 2019

Related U.S. Application Data

(63) Continuation of application No. 14/718,398, filed on May 21, 2015, now abandoned.

(Continued)

(30) Foreign Application Priority Data

Apr. 15, 2015 (KR) .................. 10-2015-0052977

(51) Int. Cl.
*G06F 3/0484* (2013.01)
*G06F 3/00* (2006.01)
(Continued)

(52) U.S. Cl.
CPC ............ *G09B 5/06* (2013.01); *G06F 3/00* (2013.01); *G06F 3/03545* (2013.01);
(Continued)

(58) Field of Classification Search
CPC ..... G09B 5/06; G06F 3/0482; G06F 3/04883; G06F 3/04886; G06F 3/03545; G06F 3/00
(Continued)

(56) References Cited

U.S. PATENT DOCUMENTS

| 8,532,596 B1 | 9/2013 | Park |
| 8,774,869 B2 | 7/2014 | Park |

(Continued)

FOREIGN PATENT DOCUMENTS

| CN | 101256463 A | 9/2008 |
| CN | 101620502 A | 1/2010 |

(Continued)

OTHER PUBLICATIONS

Communication dated Jun. 14, 2019, issued by the Chinese Patent Office in counterpart Chinese Application No. 201580026981.X.

(Continued)

*Primary Examiner* — John W Miller
*Assistant Examiner* — Omer Khalid
(74) *Attorney, Agent, or Firm* — Sughrue Mion, PLLC

(57) ABSTRACT

A display apparatus and a controlling method of the same are provided. The display apparatus includes: an input unit configured to receive an image from at least one input source; a storage configured to store a program for performing an electronic blackboard function; a display configured to output a screen providing the electronic blackboard function; and a processor configured to control to output, via the display, the received image on at least one area of the screen, and to perform the electronic blackboard function with respect to an entire area of the screen.

14 Claims, 14 Drawing Sheets

Related U.S. Application Data

(60) Provisional application No. 62/001,271, filed on May 21, 2014.

(51) Int. Cl.
  *G06F 3/0354* (2013.01)
  *G06F 3/0482* (2013.01)
  *G06F 3/0488* (2013.01)
  *G09B 5/06* (2006.01)

(52) U.S. Cl.
  CPC ........ *G06F 3/0482* (2013.01); *G06F 3/04845* (2013.01); *G06F 3/04883* (2013.01); *G06F 3/04886* (2013.01); *G06F 2203/04804* (2013.01)

(58) Field of Classification Search
  USPC .......................................................... 348/565
  See application file for complete search history.

(56) References Cited

U.S. PATENT DOCUMENTS

| | | | |
|---|---|---|---|
| 8,948,819 B2 | 2/2015 | Yun et al. | |
| 9,247,146 B2 | 1/2016 | Park | |
| 9,600,178 B2 | 3/2017 | Yun et al. | |
| 2001/0052946 A1 | 12/2001 | Sato | |
| 2010/0188428 A1* | 7/2010 | Shin | H04M 1/0272 345/661 |
| 2011/0145717 A1 | 6/2011 | Joo | |
| 2012/0151439 A1 | 6/2012 | Demant et al. | |
| 2012/0302167 A1* | 11/2012 | Yun | G06F 3/0416 455/41.2 |
| 2013/0263002 A1* | 10/2013 | Park | G06F 16/7867 715/719 |
| 2013/0298071 A1 | 11/2013 | Wine | |
| 2013/0298073 A1* | 11/2013 | Kim | G06F 3/04886 715/780 |
| 2013/0331152 A1 | 12/2013 | Park | |
| 2014/0019905 A1* | 1/2014 | Kim | G06F 3/04883 715/780 |
| 2014/0028613 A1 | 1/2014 | Hwang et al. | |
| 2014/0028617 A1* | 1/2014 | Kim | G06F 3/04886 345/174 |
| 2014/0055399 A1* | 2/2014 | Lee | G10L 13/00 345/173 |
| 2014/0056571 A1 | 2/2014 | Keni et al. | |
| 2014/0253779 A1 | 9/2014 | Park | |
| 2015/0116251 A1 | 4/2015 | Yun et al. | |

FOREIGN PATENT DOCUMENTS

| | | |
|---|---|---|
| CN | 102855079 A | 1/2013 |
| CN | 103428359 A | 12/2013 |
| EP | 2549717 A1 | 1/2013 |

OTHER PUBLICATIONS

Communication dated Jul. 11, 2019, issued by the Korean Patent Office in counterpart Korean Application No. 10-2015-0052977.
Search Report dated Jul. 29, 2015 issued by the International Searching Authority in counterpart International Patent Application No. PCT/KR2015/005091 (PCT/ISA/210).
Written Opinion dated Jul. 29, 2015 issued by the International Searching Authority in counterpart International Patent Application No. PCT/KR2015/005091 (PCT/ISA/237).
Communication issued by the European Patent Office dated Dec. 7, 2017 in counterpart European Patent Application No. 15795875.2.
Communication dated Nov. 7, 2019, issued by the European Patent Office in counterpart European Application No. 15795875.2.
Communication dated Jan. 9, 2020, issued by the State Intellectual Property Office of P.R. China in counterpart Chinese Application No. 201580026981.X.
Communication dated Apr. 21, 2020, from the State Intellectual Property Office of People's Republic of China in counterpart Application No. 201580026981.X.
Communication dated Jul. 29, 2020 issued by the State Intellectual Property Office of P.R. China in English counterpart Chinese Apolication No. 201580026981.X.
Communication dated Jul. 8, 2021, issued by the European Patent Office in counterpart European Application No. 15795875.2.

* cited by examiner

DISPLAY APPARATUS AND CONTROLLING METHOD THEREOF

CROSS-REFERENCE TO RELATED APPLICATION

This application is a Continuation of U.S. application Ser. No. 14/718,398, filed May 21, 2015, which claims priority from Korean Patent Application No. 10-2015-0052977, filed on Apr. 15, 2015 in the Korean Intellectual Property Office, and claims the benefit of U.S. Provisional Patent Application No. 62/001,271, filed on May 21, 2014 in the United States Patent and Trademark Office, the disclosures of which are incorporated herein by reference in their entireties.

BACKGROUND

1. Field

Apparatuses and methods consistent with exemplary embodiments relate to a display apparatus and a controlling method thereof, and more particularly, to a display apparatus that supports an electronic blackboard and a controlling method thereof.

2. Description of the Related Art

With the development of electronic technologies, various types of electronic products have been developed and distributed. In particular, various display apparatuses such as televisions (TVs), mobile phones, personal computers (PCs), notebook PCs, personal digital assistants (PDAs), etc., have been widely used in general households.

In addition to a function of displaying contents by such display apparatuses, a function of an electronic blackboard in which handwriting can be input has been widely used.

Meanwhile, in order to use the electronic blackboard function on a general display apparatus, a display apparatus receives an image regarding an electronic blackboard screen from an external apparatus that executes the electronic blackboard function and displays the electronic blackboard screen.

To do so, an external apparatus that executes the electronic blackboard function is required, which causes inconvenience to users.

Accordingly, there is a growing need for a general display apparatus to perform an electronic blackboard function autonomously while performing general functions of the display apparatus.

SUMMARY

Aspects of one or more exemplary embodiments relate to a display apparatus that performs an electronic blackboard function while displaying an image received from various external input sources as a background screen, and a controlling method thereof.

According to an aspect of an exemplary embodiment, there is provided a display apparatus, including: an input unit configured to receive an image from at least one input source; a storage configured to store a program for performing an electronic blackboard function; a display configured to output a screen providing the electronic blackboard function; and a processor configured to control to output, via the display, the received image on at least one area of the screen, and to perform the electronic blackboard function with respect to an entire area of the screen.

The processor may be further configured to control to output, via the display, a background image provided by the electronic blackboard function on the entire area of the screen, to adjust a transparency of at least one area of the background image that overlaps the at least one area of the screen on which the received image is output, and to provide the background image of which the transparency is adjusted.

The processor may be further configured to adjust a transparency of an area, of a background image provided by the electronic blackboard function, that overlaps the at least one area of the screen on which the received image is output, to generate a background screen in which the background image of which the transparency is adjusted and the received image are synthesized, and to provide the generated background screen on the entire area of the screen.

The electronic blackboard function may include at least one of a handwriting input function, an editing function, a video play function, and a function of storing a screen where handwriting is input.

The processor may be further configured to, in response to the image received from the at least one input source being output on the at least one area of the screen, inactivate a video play function that is previously activated on the screen.

The processor may be further configured to, in response to the image received from the at least one input source including an audio signal, inactivate a video play function that is previously activated on the screen.

The processor may be further configured to output, on an area of the screen via the display, a menu for controlling the at least one input source.

The processor may be further configured to output, via the display, the image received from the at least one input source in a form of at least one of Picture In Picture (PIP) and Picture By Picture (PBP).

The processor may be further configured to output, via the display, a first image received from a first input source on at least one area of the screen, and a second image received from a second input source on a remaining area of the screen.

According to an aspect of another exemplary embodiment, there is provided a controlling method of a display apparatus, the method including: receiving an image from at least one input source; outputting the received image on at least one area of a screen providing an electronic blackboard function; and performing the electronic blackboard function with respect to an entire area of the screen.

The outputting may include: outputting a background image provided by the electronic blackboard function on the entire area of the screen; adjusting a transparency of at least one area of the background image that overlaps the at least one area of the screen on which the received image is output; and providing the background image of which the transparency is adjusted.

The outputting may include: adjusting a transparency of an area, of a background image provided by the electronic blackboard function, that overlaps the at least one area of the screen on which the received image is output; generating a background screen in which the background image of which the transparency is adjusted and the received image are synthesized; and providing the generated background screen on the entire area of the screen.

The electronic blackboard function may include at least one of a handwriting input function, an editing function, a video play function, and a function of storing a screen where handwriting is input.

The method may further include: in response to the image received from the at least one input source being output on the at least one area of the screen, inactivating a video play function that is previously activated on the screen.

The inactivating may include, in response to the image received from the at least one input source including an audio signal, inactivating the video play function that is previously activated on the screen.

The method may further include: outputting, on an area of the screen, a menu for controlling the at least one input source.

The outputting may include outputting the image received from the at least one input source in a form of at least one of Picture In Picture (PIP) and Picture By Picture (PBP).

The outputting may include outputting a first image received from a first input source on at least one area of the screen, and outputting a second image received from a second input source on a remaining area of the screen.

According to an aspect of another exemplary embodiment, there is provided a processing apparatus, including: a storage configured to store a program for performing an electronic blackboard function on a display; and a processor configured to control to output an image, received from at least one external source, on at least one area of a screen, and to perform the electronic blackboard function with respect to an entire area of the screen.

The processor may be further configured to control to output a background image provided by the electronic blackboard function on the entire area of the screen, to adjust a transparency of at least one area of the background image that overlaps the at least one area of the screen on which the image is output, and to provide the background image of which the transparency is adjusted.

The processor may be further configured to adjust a transparency of an area, of a background image provided by the electronic blackboard function, that overlaps the at least one area of the screen on which the image is output, to generate a background screen in which the background image of which the transparency is adjusted and the image are synthesized, and to provide the generated background screen on the entire area of the screen.

The electronic blackboard function may include at least one of a handwriting input function, an editing function, a video play function, and a function of storing a screen where handwriting is input.

The processor may be further configured to, in response to the image being received and output on the at least one area of the screen, inactivate a video play function that is previously activated on the screen.

The processor may be further configured to, in response to the image including an audio signal, inactivate a video play function that is previously activated on the screen.

The processor may be further configured to output, on an area of the screen, a menu for controlling at least one input source through which the image is received.

According to an aspect of another exemplary embodiment, there is provided a non-transitory computer readable recording medium having recorded thereon a program executable by a computer for performing the above method.

According to aspects of one or more exemplary embodiments, a display apparatus may use an image received from various external input sources as a background image and perform an electronic blackboard function, thereby improving user convenience.

BRIEF DESCRIPTION OF THE DRAWINGS

The above and/or other aspects will be more apparent by describing exemplary embodiments with reference to the accompanying drawings, in which.

DETAILED DESCRIPTION

Exemplary embodiments may vary, and may be provided in different forms. While describing exemplary embodiments, if it is determined that the specific description regarding a known technology obscures the gist of the disclosure, the specific description may be omitted. The terms used hereinafter have been defined in consideration of the features of an exemplary embodiment, and the definitions thereof may vary depending on users, intention of operators or relations, etc. Thus, the definition of the terms should be determined based on the overall contents of this specification. Expressions such as "at least one of," when preceding a list of elements, modify the entire list of elements and do not modify the individual elements of the list.

Figure 1:
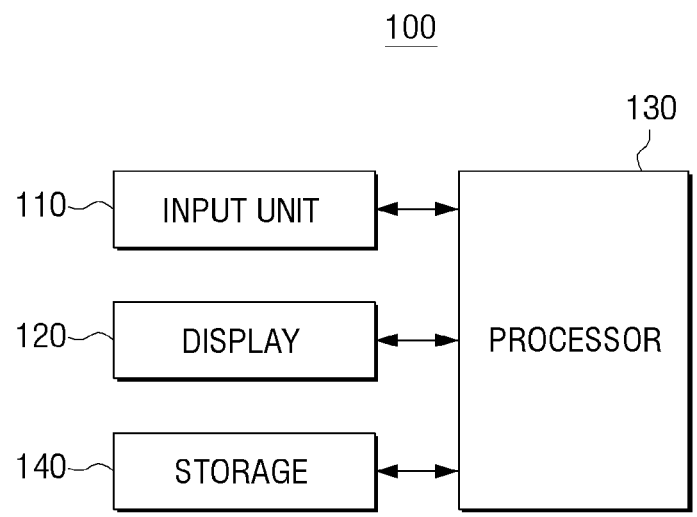
FIG. 1 is a block diagram illustrating a configuration of a display apparatus according to an exemplary embodiment.

FIG. 1 is a block diagram illustrating a configuration of a display apparatus 100 according to an exemplary embodiment.

Referring to FIG. 1, a display apparatus 100 includes an input unit 110 (e.g., inputter or input device), a display 120, a processor 130, and a storage 140. Here, the display apparatus 100 may be realized as various types of electronic apparatuses such as a TV, an electronic blackboard, an electronic table, a Large Format Display (LFD), a smart phone, a tablet, a desktop PC, a notebook PC, etc. The electronic blackboard refers to a conductive blackboard where a user may write with an electronic pen as the surface includes a plane with conductivity.

The display apparatus 100 according to an exemplary embodiment may be realized not only as an electronic blackboard but also as a general TV, an electronic table, a smart phone, a tablet, etc., which can perform the electronic blackboard function.

The input unit 110 may receive an image from at least one input source. For example, the input unit 110 may include an input port that may support TV, High-Definition Multimedia Interface (HDMI), Digital Visual Interface (DVI), universal serial bus (USB), Digital Living Network Alliance (DLNA), any of various wireless connection methods, etc. In addition, the input unit 110 may receive an image in various formats through each input port. The available standard is not limited to the above, and other types of standards may be supported.

The display 120 displays various objects such as moving images, still images, photos, documents, etc., which may be generated as a plurality of images and displayed in a certain frame, such as such as a movie, a drama, a recorded image, a slow video, etc. In addition, the display 120 may include a user interface screen including various menus. Such a user interface screen may include various menus to control the display apparatus 100, for example, volume up/down, channel up/down, environment setting menu, etc.

In particular, the display 120 may display a screen providing an electronic blackboard function. The screen providing an electronic blackboard function may be displayed as a black and white screen or a transparent screen where transparency is adjusted. In addition, the electronic blackboard function refers to all functions that are performed by a general electronic blackboard apparatus, of which an exemplary embodiment will be described below.

To do so, the display 120 may be realized as a Liquid Crystal Display (LCD), an Organic Light Emitting Diode (OLED) display, a Plasma Display Panel (PDP), an Active-Matrix OLED (AMOLED) display, etc.

The storage 140 stores a program for performing an electronic blackboard function. In order for the display 120 to provide a screen for performing an electronic blackboard function, the program for performing the electronic blackboard function, which is stored in the storage 140, is to be executed by the processor 130. The program for performing the electronic blackboard function may be stored at the time of designing, manufacturing, or distributing the display apparatus 100, but may be updated in the form of software or firmware. Such an update may be performed by wired or wireless communication.

Meanwhile, the processor 130 may provide an image received from at least one input source on at least one area of a screen as a background screen, and perform an electronic blackboard function with respect to the whole screen including the background screen.

Specifically, the processor 130 may provide an image received from an input source that is connected through at least one input port included in the input unit 110 as a background screen of part of or the whole area of a screen that provides an electronic blackboard function.

For example, the processor 130 may provide an image corresponding to a broadcast signal received from a TV connected through a TV input port as a background screen of a left area of a screen that provides an electronic blackboard function.

Accordingly, an electronic blackboard screen, that is, a background image provided by an electronic blackboard, may be displayed on a left part of the screen displayed by the display 120, and an image corresponding to a broadcast signal received from a TV may be displayed as a background screen on a right part of the screen.

The processor 130 may perform an electronic blackboard function with respect to the whole screen including the background screen. Specifically, while an electronic blackboard screen is displayed on a left part of the screen displayed by the display 120, and an image corresponding to a broadcast signal received from a TV is displayed as a background screen on a right part of the screen, the processor 130 may perform an electronic blackboard function with respect to the whole screen without distinguishing the electronic blackboard screen and the background screen of the image corresponding to the received broadcast signal.

In other words, the processor 130 may perform an electronic blackboard function not only for the electronic blackboard screen that is displayed on one part (e.g., the right part) of the screen, but also for the background screen on another part (e.g., the left part) of the screen where the image corresponding to a received broadcast signal is displayed.

Meanwhile, as for the method of configuring a background screen while an electronic blackboard function with an image received from an input source being provided as a background screen is provided, the processor 130 may adjust the transparency of the background image of the electronic blackboard, and overlap and display the background image of the electronic blackboard of which transparency is adjusted on the image received from the input source.

Specifically, the processor 130 may display a background image provided by an electronic blackboard on the entire screen, adjust a transparency of a background image on at least one area including an area where an image received from at least one input source is displayed, and provide the image.

For example, if an image received from a TV is to be displayed on a right side of a background image provided by an electronic blackboard that is displayed on the entire screen, the processor 130 may adjust the transparency of a background image corresponding to an area where the image received from the TV is displayed to be '100%'.

In other words, when the transparency of the background image corresponding to the area where the image received from the TV is displayed is adjusted to '100%', the image received from the TV may be displayed by transmitting the background image of the electronic blackboard so that a user may watch the image received from the TV on the right side of the entire screen, and the background image provided by the electronic blackboard through the remaining screen.

As such, according to the above-described exemplary embodiment, two graphic planes are utilized: a graphic plane to display an image received from an input source; and a graphic plane to display a background image of an electronic board.

Meanwhile, the processor 130 may display a single screen by synthesizing an image received from an input source with a background image of an electronic blackboard of which transparency is adjusted.

Specifically, the processor 130 may adjust the transparency of an area where an image received from at least one input source is displayed out of an entire area of a background image provided by an electronic blackboard, generate a background image where the background image where the transparency is adjusted is synthesized with the received image, and provide the image on the entire screen.

In other words, the processor 130 may generate a single screen by synthesizing the background image of an electronic blackboard in which the transparency of the area where the image received from the TV is displayed is adjusted to be '100%' with the image received from the TV, and display the generated screen.

In this case, two graphic planes may not be provided, that is, a graphic plane to display an image received from an input source and a graphic plane to display a background image of an electronic blackboard. Rather, in this case, only one graphic plane may be provided to display a screen where a background image of an electronic blackboard of which transparency is adjusted and an image received from a TV is synthesized.

Meanwhile, the processor 130 may display an image received from an input source on the entire screen or on part of the screen by limiting the output of the entire area or part of the background image of an electronic blackboard.

In addition, the electronic blackboard function may include at least one of a handwriting function, an editing function, a video play function, and a function of storing a handwriting screen.

The handwriting function may be performed by a touch input through a user manipulation or an input by an electronic pen, and the processor 130 may execute a function or an application corresponding to a handwriting that has been input.

The editing function may include erasing, correcting, copying of an input text, or changing the size, font, color, font configuration, etc., and may include other document editing functions that are generally used.

The video play function refers to a function of reproducing a moving image, a still image, etc., on an electronic blackboard, and the function of storing a handwriting screen refers to a function of storing a screen where a handwriting is input based on date, location, and time.

The electronic blackboard function is not limited to the above-described functions, and may include other functions that are used in an electronic blackboard apparatus.

Figure 2:
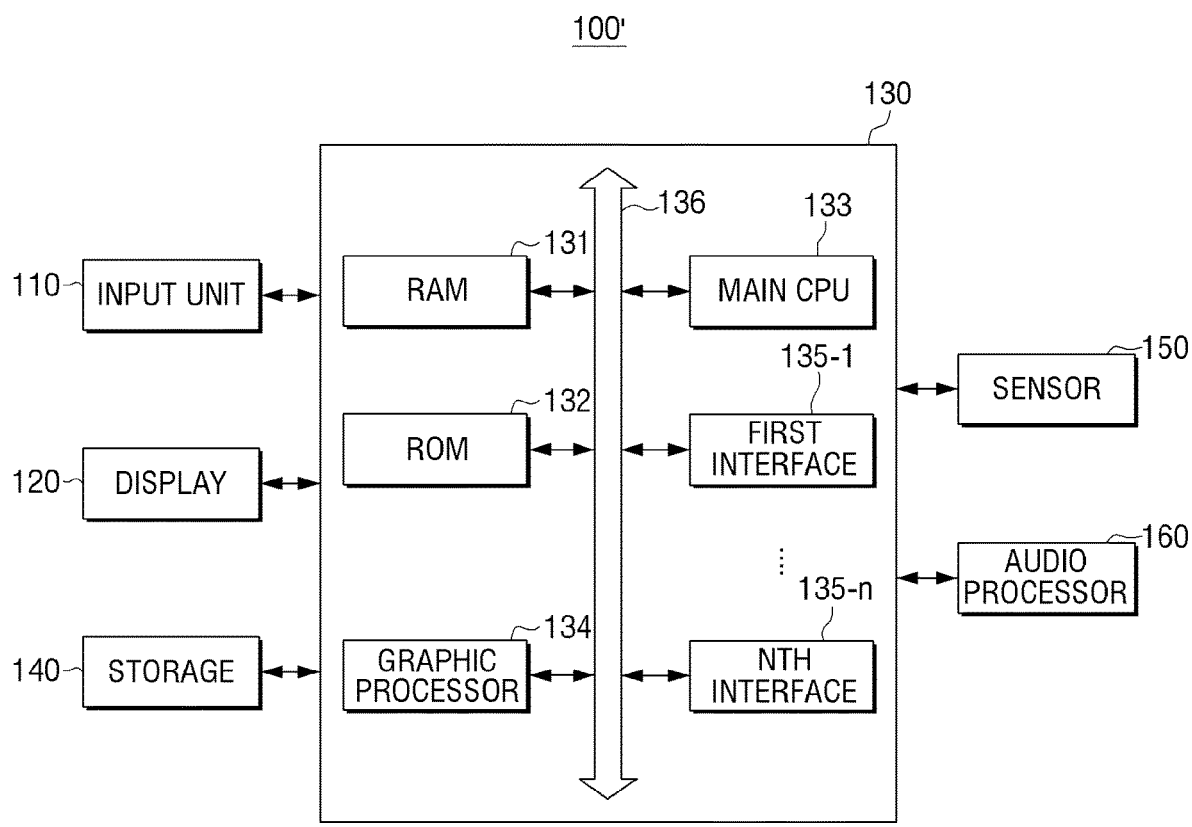
FIG. 2 is a block diagram illustrating a configuration of the display apparatus of FIG. 1 in detail.

FIG. 2 is a block diagram illustrating a configuration of the display apparatus 100' of FIG. 1 in detail.

Referring to FIG. 2, a display apparatus 100' includes the input unit 110 (e.g., inputter or input device), the display 120, the processor 130, the storage 140, a sensor 150, and an audio processor 160. A detailed description of elements of FIG. 2 that are redundant with those in FIG. 1 may be omitted.

The processor 130 controls overall operations of the display apparatus 100.

Specifically, the processor 130 includes a random access memory (RAM) 131, a read-only memory (ROM) 132, a main central processing unit (CPU) 133, a graphic processor 134, first to nth interfaces 135-1~135-n, and a bus 136.

The RAM 131, the ROM 132, the main CPU 133, the graphic processor 134, the first to the nth interface 135-1~135-n, etc. may be interconnected through the bus 136.

The first to the nth interface (135-1 to 135-n) are connected to the above-described various elements. One of the interfaces 135-1 to 135-n may be a network interface that is connected to an external apparatus via a network (such as a local area network, a wide area network, a mobile network, or the Internet).

The main CPU 133 accesses the storage 140, and performs booting using an Operating System (O/S) stored in the storage 140. In addition, the main CPU 133 performs various operations using various programs, contents, data, etc., stored in the storage 160.

The ROM 132 stores a set of commands for system booting. If a turn-on command is input and thus, power is supplied, the main CPU 133 copies the 0/S (or a portion thereof) stored in the storage 140 to the RAM 131 according to a command stored in the ROM 132, and boots a system by executing the 0/S. When the booting is completed, the main CPU 133 copies various application programs stored in the storage 140 to the RAM 131, and executes the application programs copied to the RAM 131 to perform various operations.

The graphic processor 134 generates a screen including various objects such as a pointer, an icon, an image, a text, etc., using a computing unit and a rendering unit (e.g., renderer). The computing unit computes property values such as coordinates, shape, size, and color of each object to be displayed according to the layout of the screen using a control command received from an input unit. The rendering unit generates a screen with various layouts including objects based on the property values computed by the computing unit. The screen generated by the rendering unit is displayed in a display area of the display 110.

Meanwhile, the operations of the above-described processor 130 may be performed by a program stored in the storage 140.

The storage 140 stores various data such as an O/S software module to drive the display apparatus 100' and various multimedia contents.

In particular, the storage 140 includes various software modules to provide an image received from at least one input source on at least one area of a screen as a background screen and to perform an electronic blackboard function with respect to the entire screen including the background screen, which will be described in detail below with reference to FIG. 3.

Meanwhile, the sensor 150 may include various sensors such as a touch sensor to sense a touch, a motion sensor to sense a user motion, etc. In addition, the sensor 150 may also include a sensor to sense the movement and trace of an electronic pen, etc.

The audio processor 160 may process an audio signal in accordance with an output range of the speaker 110 and a user setting regarding sound quality.

Figure 3:
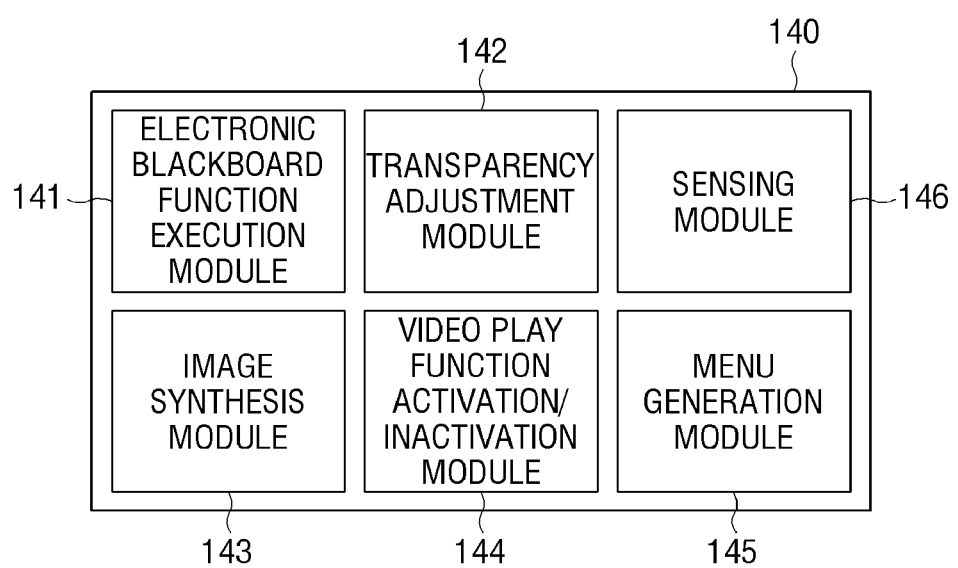
FIG. 3 is a view regarding a software module stored in a storage according to an exemplary embodiment.

FIG. 3 is a view regarding a software module stored in a storage 140 according to an exemplary embodiment.

Referring to FIG. 3, the storage 140 may store programs such as an electronic blackboard function execution module 141, a transparency adjustment module 142, an image synthesis module 143, a video play function activation/inactivation module 144, a menu generation module 145, a sensing module 146, etc.

Meanwhile, the above-described operations of the processor 130 may be performed by executing a program stored in the storage 140. Hereinafter, detailed operations of the processor 130 using a program stored in the storage 140 will be described.

The electronic blackboard function execution module 141 may refer to a program to execute an electronic blackboard function, or a platform program to execute the program that executes the electronic blackboard function. In other words, the electronic blackboard function execution module 141 may include software and the like to execute an electronic blackboard function using a program to execute the electronic blackboard function.

The transparency adjustment module 142 may perform a function of adjusting the transparency of a background image provided by an electronic blackboard.

The image synthesis module 143 may perform a function of synthesizing an image received from an input source with a background image provided by an electronic blackboard and of which transparency is adjusted. Specifically, the image synthesis module 143 may perform a function of generating a single screen by synthesizing a background image of an electronic blackboard in which the transparency of an area in which an image received from an input source is displayed or to be displayed is adjusted with the image received from the input source.

The video play function activation/inactivation module 144 may perform the function of selectively inactivating a video play function that is activated on an electronic blackboard screen when an image received from an input source is provided as a background screen, which will be described in detail below.

The menu generation module 145 may perform a function of generating a control menu with respect to an external input source that is connected through the input unit 110. A user may easily control an external input source that is connected to the display apparatus 100 using a menu generated by the menu generation module 145.

The sensing module 146 may perform a function of calculating a sensing value using data extracted from various sensors of the sensor 150.

As such, the processor 130 may provide an image received from an input source on at least one area of a screen as a background screen using various software modules stored in the storage 140, and perform an electronic blackboard function with respect to the entire screen including the background screen.

Figure 4:
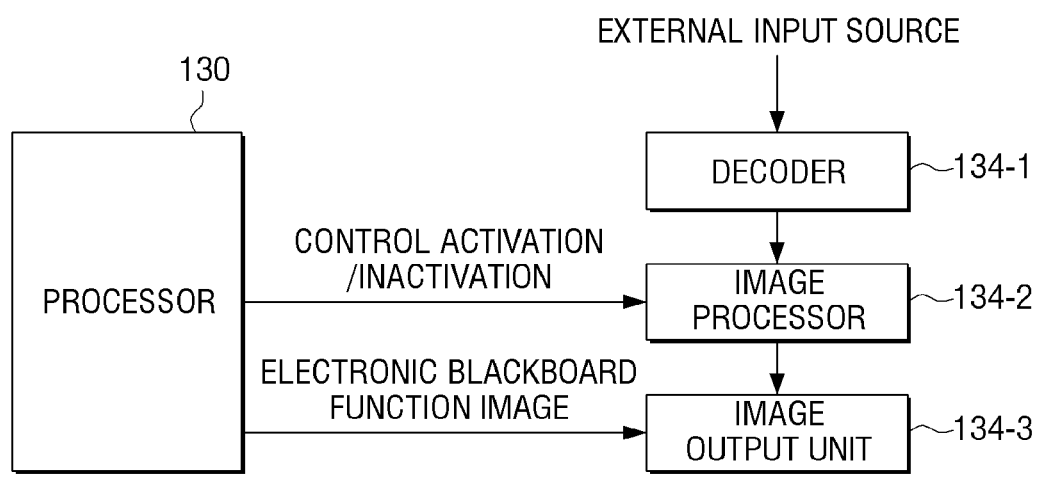
FIG. 4 is a view provided to explain a process of inactivating a part of electronic blackboard functions according to an exemplary embodiment.

FIG. 4 is a view provided to explain a process of inactivating a part of electronic blackboard functions according to an exemplary embodiment.

Referring to FIG. 4, an image received from an external input source is decoded through a decoder 134-1, and the processor 130 may control an image processor 134-2 to inactivate a video play function that is in operation on a background image of an electronic blackboard. Of course, if an image is not received from an external input source, the processor 130 may control the image processor 134-2 to activate the video play function that is in operation on the background image of the electronic blackboard.

In addition, the processor 130 may control to provide and output a background image provided by an electronic blackboard to an image output unit 134-3 (e.g., image outputter or image output device) while a video play function on the background image of the electronic blackboard is inactivated by an image processor 134-2.

As described above, if a video received from an external input source is displayed as a background screen, the processor 130 may determine whether to selectively activate or inactivate a video play function on a background image of an electronic blackboard, thereby preventing or mitigating a problem of outputting audio signals in an overlapping manner and a shortage of resources.

If an image received from at least one input source includes an audio signal, the processor 130 may inactivate a video play function that is activated on an electronic blackboard screen.

In other words, when an audio signal is to be output when a video received from an input source is reproduced, it is not possible or not desirable to output the audio signal of a video reproduced on an electronic blackboard screen simultaneously and thus, the processor 130 inactivates a video play function of the electronic blackboard screen, thereby preventing the problem of outputting a plurality of audio signals through a speaker.

The decoder 134-1, the image processor 134-2 and the image output unit 134-3 in FIG. 4 may be included in the graphic processor 134, and the graphic processor 134 including the decoder 134-2, the image processor 134-2 and the image output unit 134-3 may be disposed inside or outside the processor 130.

Meanwhile, the processor 130 may display an image received from at least one input source in the form of at least one of Picture In Picture (PIP) and Picture By Picture (PBP).

In addition, the processor 130 may provide a first image received from a first input source on at least one area of a screen as a background screen and a second image received from a second input source on the remaining area as a background screen.

Specifically, the processor 130 may provide an image corresponding to a broadcast signal received from a TV on a left area of a screen as a background screen, provide an image received from a digital versatile disc (DVD) player on a right side of the screen as a background screen, and display the image corresponding to the broadcast signal received from the TV and the image received from the DVD player in the form of PIP or PBP, which will be described in detail with reference to FIGS. 5 to 10.

FIGS. 5 to 10 are views illustrating various ways of displaying an electronic blackboard screen and an image received from an input source according to one or more exemplary embodiments.

Figure 5:
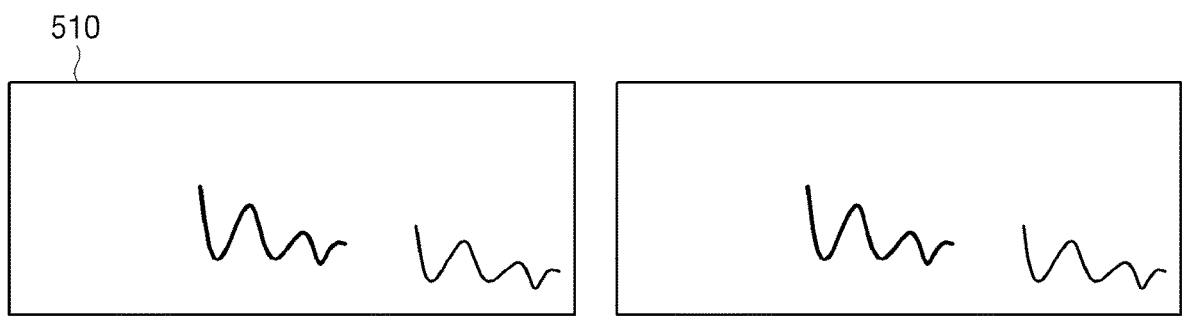
FIGS. 5 to 10 are views illustrating an electronic blackboard screen and various ways of displaying an image received from an input source according to one or more exemplary embodiments.

Referring to FIG. 5, the left image illustrates that a handwriting is input on a background image 510 provided by an electronic blackboard, and the right image simplifies the left image showing that an image currently received from an input source is not displayed and only the background image 510 provided by the electronic blackboard is displayed.

Figure 6:
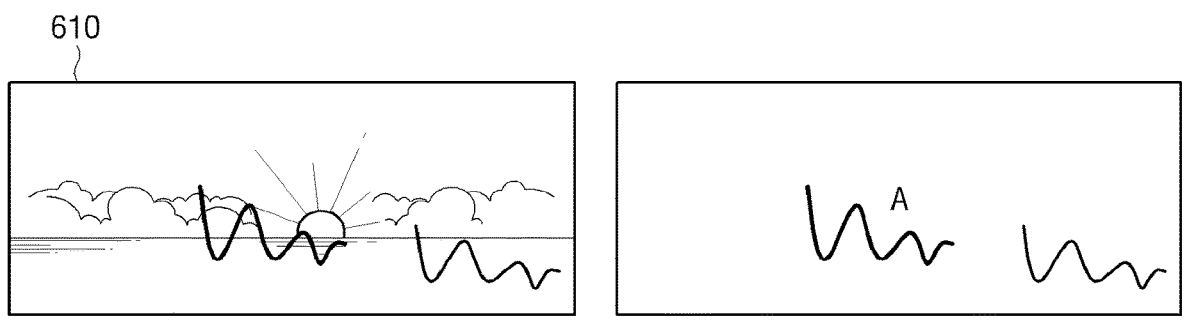

Referring to FIG. 6, the left image illustrates that an electronic blackboard function is performed and a handwriting is input while an image 610 received from an input source is displayed, and the right image simplifies the left image showing that a handwriting is input while the image currently received from input source A is displayed as a background screen.

The process of performing the electronic blackboard function while the image 610 received from an input source is displayed as illustrated in FIG. 6 can be realized by adjusting the transparency of at least a portion of a background image corresponding to an area overlapping the image 610 received from the input source and displaying the screen, or by limiting the output of at least the portion of the background image corresponding to the area overlapping the image 610 received from the input source as described above.

For example, the transparency of the entire background image for performing the electronic blackboard function in FIG. 6 is increased and the image 610 received from the input source is displayed in an overlapping manner so that the image 610 received from the input source can be displayed as a background screen of the entire screen and the electronic blackboard function can be performed.

Figure 7:
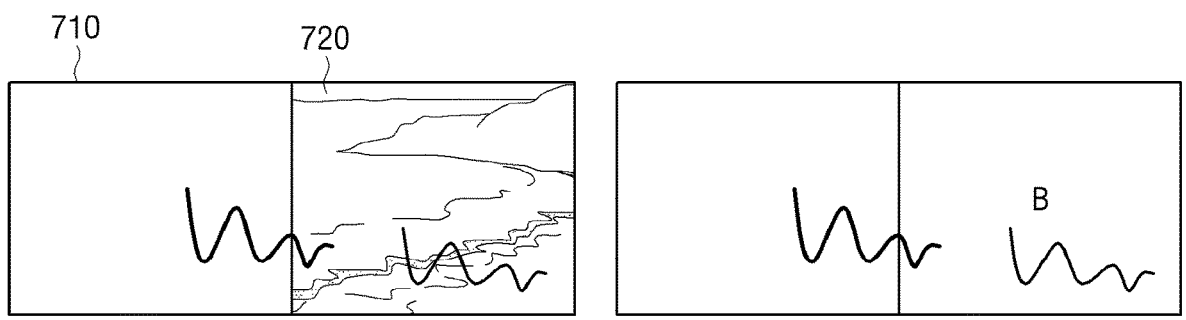

Meanwhile, referring to FIG. 7, the left image illustrates that an electronic blackboard function is performed on the entire screen while a background image 710 provided by an electronic blackboard and an image 720 received from an input source are displayed, and the right image simplifies the left image showing that a handwriting is input while an image currently received from input source B is displayed as a background screen along with the background image 710 provided currently by the electronic blackboard.

The process of performing the electronic blackboard function while the background image 710 provided by the electronic blackboard and the image 720 received from the input source are displayed as illustrated in FIG. 7 can be realized by adjusting the transparency of a portion of the background image 710 corresponding to an area overlapping the image 720 received from the input source and displaying the screen, or by limiting the output of the portion of the background image 710 corresponding to the area overlapping the image 720 received from the input source as described above.

For example, the transparency of only an area corresponding to an area where the image 720 received from input source B is displayed out of the background image 710 provided by the electronic blackboard is increased and the image 720 received from input source B is displayed in an overlapping manner so that the image 720 received from input source B can be displayed only on part of the entire screen and the electronic blackboard function can be performed with respect to the entire screen.

Figure 8:
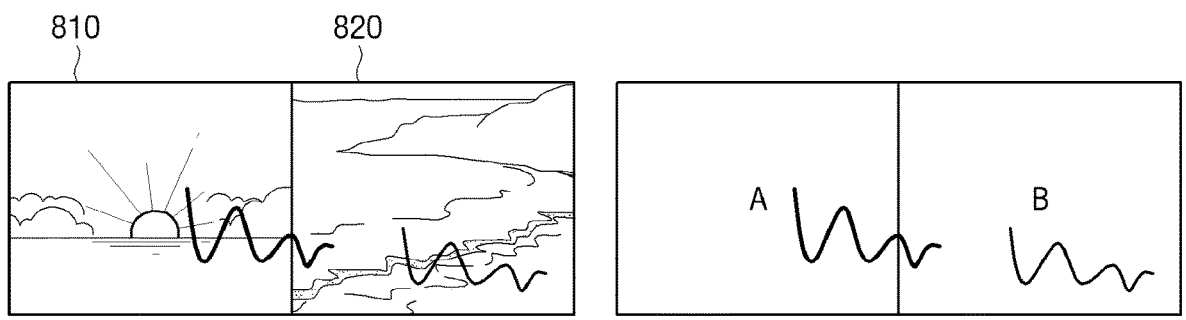

Referring to FIG. 8, the left image illustrates that an electronic blackboard function is performed on the entire screen while an image 810 received from a first input source and an image 820 received from a second input source are displayed in the form of PBP, and the right image simplifies the left image showing that a handwriting is input while the image received from input source A and the image received from input source B are displayed together.

The exemplary embodiment of FIG. 8 may be realized by adjusting the transparency of a background image provided by an electronic blackboard to the most transparent state and displaying the background image on the image 810 received from the first input source and the image 820 received from the second input source in an overlapping manner. Alternatively, the exemplary embodiment of FIG. 8 may be realized by limiting the output of the entire background image provided by the electronic blackboard, and displaying the image 810 received from the first input source and the image 820 received from the second input source.

Accordingly, the image 810 received from the first input source and the image 820 received from the second input source may be displayed individually, and the electronic blackboard function may be performed with respect to the entire screen without discriminating each image or reducing any image.

Figure 9:
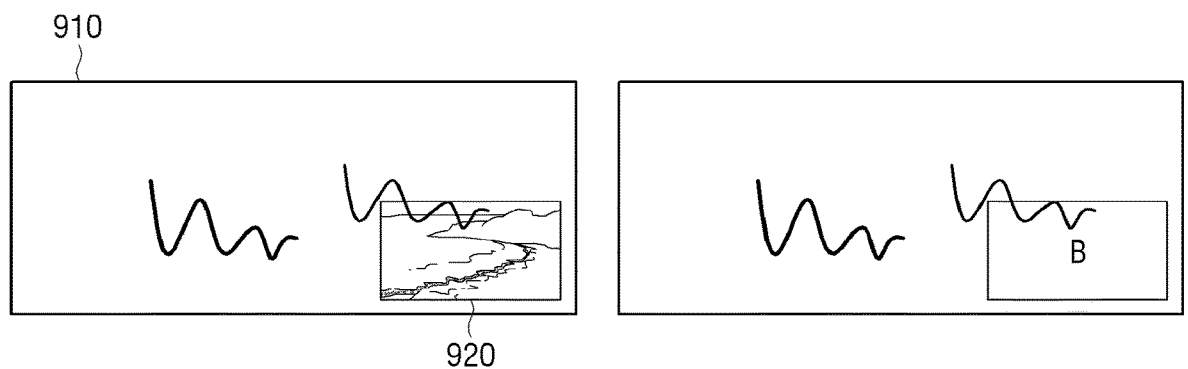

Referring to FIG. 9, the left image illustrates that an electronic blackboard function is performed on the entire screen while a background image 910 provided by an electronic blackboard and an image 920 received from an input source are displayed in the form of PIP, and the right image simplifies the left image showing that a handwriting is input while an image received from input source B is displayed as a background screen in the form of PIP along with the background image provided currently by the electronic blackboard.

The exemplary embodiment of FIG. 9 may be realized in the same manner as described above with respect to FIG. 7.

Figure 10:
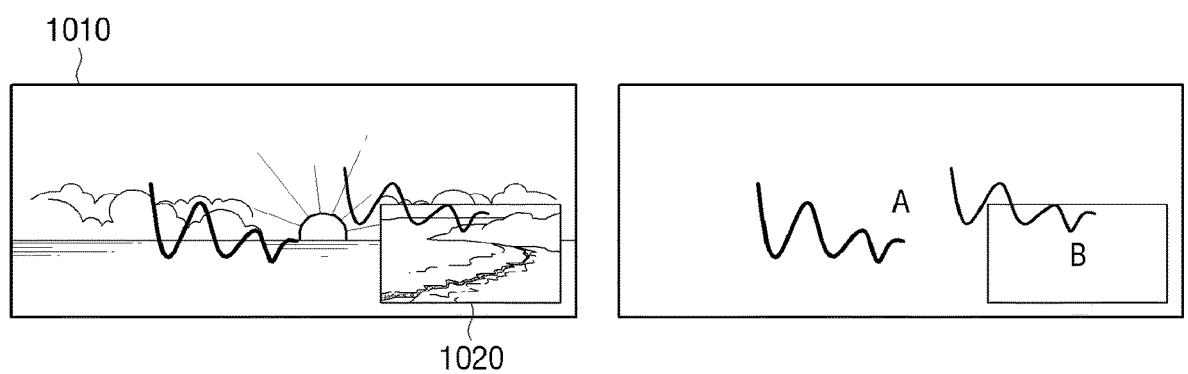

Referring to FIG. 10, the left image illustrates that an electronic blackboard function is performed on the entire screen while an image 1010 received from the first input source and an image 1020 received from the second input source are displayed in the form of PIP, and the right image simplifies the left image showing that a handwriting is input while the image currently received from input source A and the image currently received from input source B are displayed together.

The exemplary embodiment of FIG. 10 may be realized in the same manner as described above with respect to FIG. 8.

Figure 11:
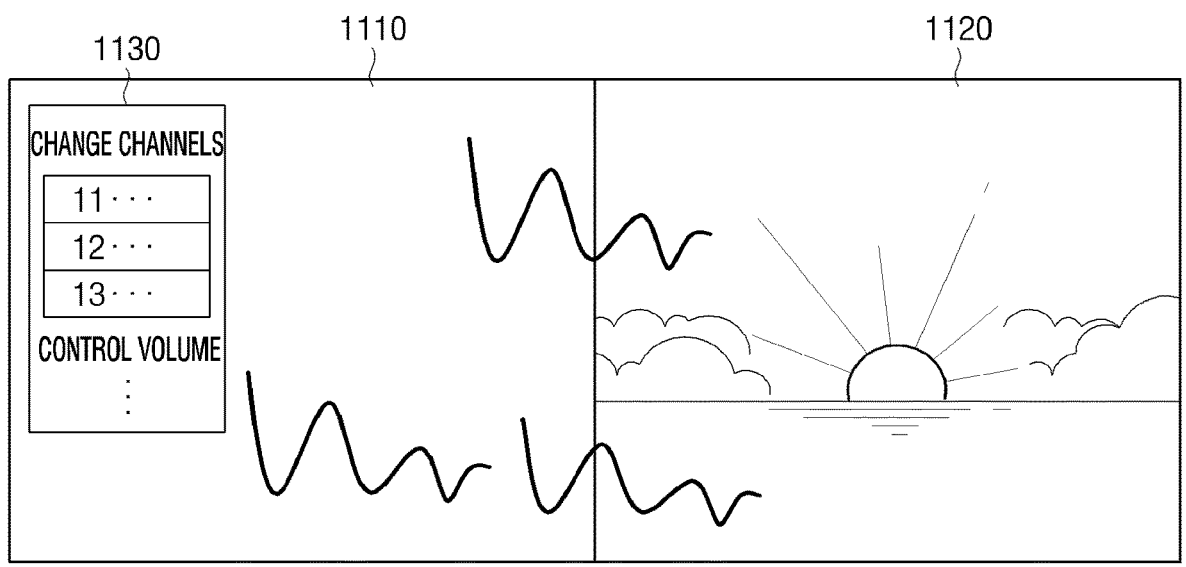
FIG. 11 is a view illustrating a menu for controlling an input source according to an exemplary embodiment.

FIG. 11 is a view illustrating a menu 1130 for controlling an input source according to an exemplary embodiment.

The processor 130 may provide a menu 1130 to control at least one input source on one area of a screen.

Referring to FIG. 11, the processor 130 may display a menu 1130 to control an input source while a background image 1110 provided by an electronic blackboard and an image 1120 received from an input source are displayed together.

For example, if an input source is a TV, the processor 130 may change or display a menu to change channels or control volume.

If an input source is a storage device such as a USB storage device, the processor 130 may display a menu to select a folder and a file.

In addition, the processor 130 may display the menu 1130 to control such an input source in the form of an on-screen display (OSD).

Figure 12:
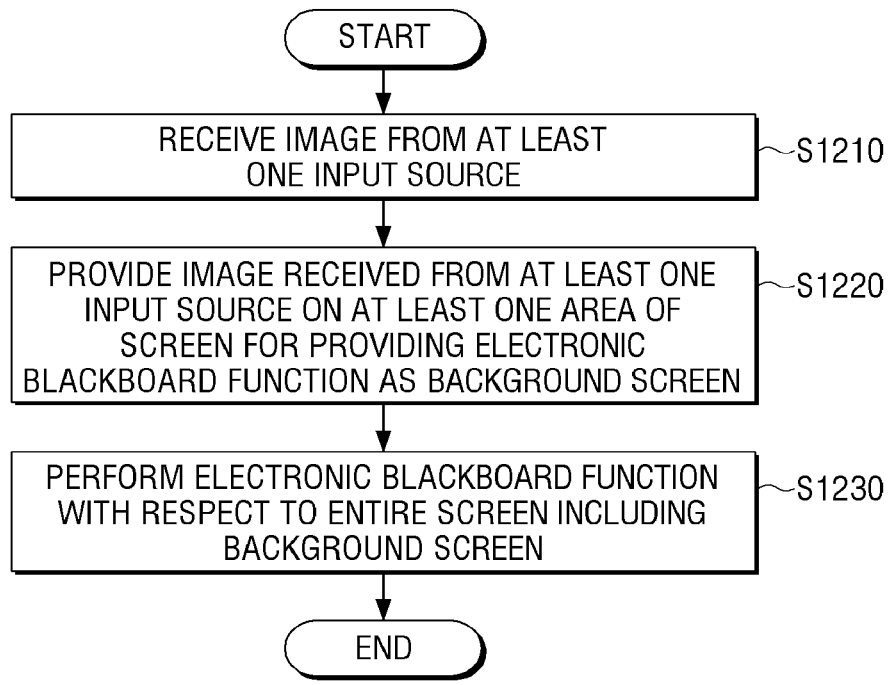
FIG. 12 is a flowchart provided to explain a method of controlling a display apparatus according to an exemplary embodiment.

FIG. 12 is a flowchart provided to explain a method of controlling a display apparatus according to an exemplary embodiment.

According to the controlling method illustrated in FIG. 12, an image is received from at least one input source (operation S1210), and the image received from the at least one input source may be provided on at least one area of a screen for providing an electronic blackboard function (operation S1220).

Herein, the providing may include displaying a background image provided by an electronic blackboard on the entire screen, adjusting the transparency of at least one area of the background image that overlaps with an image received from at least one input source, and providing the screen.

In addition, the providing may include adjusting the transparency of the area where the image received from at least one input source is displayed out of the entirety of the background image provided by the electronic blackboard, generating a background screen where the background image of which transparency is adjusted and the received image are synthesized, and providing the screen on the entire screen.

Herein, the electronic blackboard function may include at least one of a handwriting input function, an editing function, a video play function, and a function of storing a screen on which handwriting is input.

The providing may include displaying an image received from at least one input source in the form of at least one of PIP and PBP.

In addition, the providing may include providing the first image received from the first input source on at least one area of a screen as a background screen, and providing the second image received from the second input source on the remaining area as a background screen.

The electronic blackboard function may be performed with respect to the entire screen including a background screen (operation S1230).

Meanwhile, the controlling method of the display apparatus according to an exemplary embodiment may further include inactivating a video play function that has been activated on an electronic blackboard screen when an image received from at least one input source is provided on at least one area of a screen as a background screen.

Herein, the inactivating may include inactivating the video play function that has been activated on the electronic blackboard screen when the image received from at least one input source includes an audio signal.

In addition, the controlling method of the display apparatus according to an exemplary embodiment may further include providing a menu to control at least one input source on one area of the screen.

Figure 13:
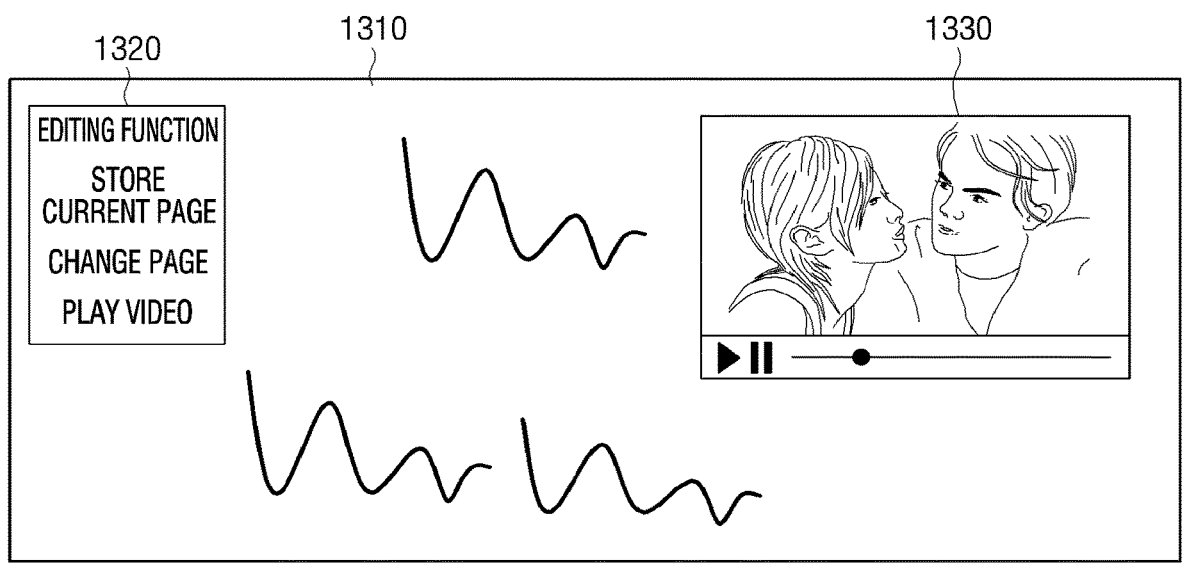
FIGS. 13 and 14 are views regarding an exemplary embodiment of activating or inactivating a video play function.
Figure 14:
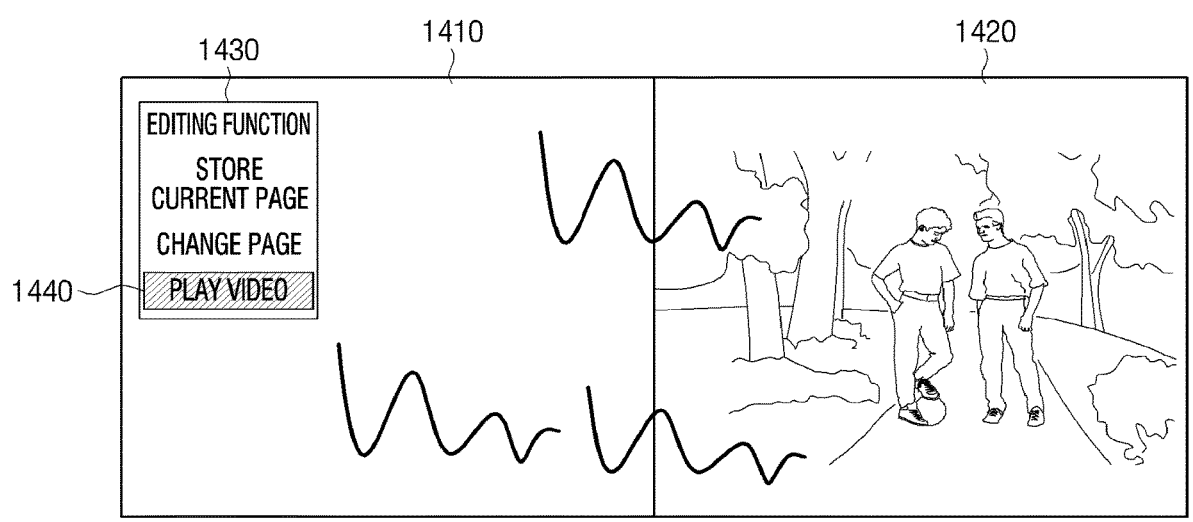

Meanwhile, FIGS. 13 and 14 are views regarding an exemplary embodiment of activating or inactivating a video play function according to an exemplary embodiment.

Referring to FIG. 13, a background image 1310 provided by an electronic blackboard may be displayed on the entire screen, and when an image received from at least one external input source is not provided on at least one area of the background image 1310 as a background image, the processor 130 may activate a video play function while displaying a menu window 1320 to control the electronic blackboard 100.

The menu window 1320 may be realized as a user interface screen, a Graphic User Interface (GUI), an OSD, etc. In FIG. 13, the menu window 1320 includes an editing function, a current page storing function, a page call function, and a video play function, but the functions of the menu window 1320 are not limited thereto, and may selectively include all or additional functions performed by an electronic blackboard.

In other words, if an image received from an external input source is not used as a background screen, the processor 130 may perform a video play function on the background image 1310 of the electronic blackboard, and display the menu window 1320 to allow a user to select the video play function. Once the user selects the video play function on the displayed menu window 1320, the processor 130 may play a video 1330 on the background image 1310 of the electronic blackboard.

In addition, referring to FIG. 14, when a background image 1410 provided by an electronic blackboard is displayed along with an image 1420 received from an input source, the processor 130 may inactivate a video play function while displaying a menu window 1430 to control the electronic blackboard.

Herein, the processor 130 processes the video play function to be distinguishable (e.g., indicated in a grey color 1440) so that a user may not select the function, although it is understood that one or more other exemplary embodiments are not limited thereto. For example, according to another exemplary embodiment, the processor 130 may control not to display the video play function on the menu window 1430. Alternatively, the processor 130 may display a response message indicating that the video play function is not supported when a user selects the video play function.

As such, the processor 130 may selectively activate or inactivate a video play function on a menu window to control the electronic blackboard according to whether an image received from an external input source is used as a background screen.

Meanwhile, a non-transitory computer readable medium which stores a program for performing the controlling method according to an exemplary embodiment may be provided.

For example, a non-transitory computer readable medium which stores a program for performing the step of providing an image received from at least one input source on at least one area of a screen for providing an electronic blackboard as a background screen and the step of performing an electronic blackboard function with respect to the entire screen including the background screen may be provided.

The non-transitory recordable medium refers to a medium which may store data semi-permanently rather than storing data for a short time, such as register, cache, memory, etc. and is readable by an apparatus. Specifically, the above-described various applications and programs may be stored and provided in a non-transitory recordable medium such as CD, DVD, hard disk, Blu-ray disk, USB, memory card, ROM, etc.

In addition, it is understood that communication between each element of the display apparatus and a source device may be performed through a bus. In addition, each device may further include a processor for performing the above-described various steps such as a CPU, a microprocessor, etc.

The foregoing exemplary embodiments and advantages are merely exemplary and are not to be construed as limiting the present inventive concept. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A display apparatus, comprising:
a storage;
an input unit comprising a circuit configured to communicate with at least one external device that is external to the display apparatus;
a touch sensor configured to detect a user input;
a display; and
a processor configured to:
control the display to display a drawing image provided by an electronic blackboard function,
based on a first input image being received from an external device via wireless communication through the input unit, control the display to display the first input image on a first area of the drawing image,
in response to receiving a user input for drawing a continuous line across between the drawing image and the first input image being detected through the touch sensor, draw the continuous line on the drawing image and the first input image, and
control the display to display, on a second area of the drawing image while displaying the first input image on the first area, a menu for controlling the external device to transmit a second input image different from the first input image through the input unit.

2. The apparatus as claimed in claim 1, wherein the processor is further configured to control to adjust a transparency of the first area of the drawing image that overlaps the first input image from the external device, and to provide the drawing image of which the transparency of the first area is adjusted.

3. The apparatus as claimed in claim 1, wherein the electronic blackboard function includes at least one of a handwriting input function, an editing function, a video play function, and a function of storing a screen where handwriting is input.

4. The apparatus as claimed in claim 3, wherein the processor is further configured to, based on the first input image from the external device being displayed on the first area of the drawing image, inactivate the video play function that is previously activated on the screen.

5. The apparatus as claimed in claim 3, wherein the processor is further configured to, based on the first input image from the external device including an audio signal, inactivate the video play function that is previously activated on the screen.

6. The apparatus as claimed in claim 1, wherein the processor is further configured to display the first input image from the external device in a form of at least one of Picture In Picture (PIP) and Picture By Picture (PBP).

7. The apparatus as claimed in claim 1, wherein the processor is further configured to display the first input image from a first external device on the first area of the drawing image, and the second input image from a second external device on a remaining area of the drawing image.

8. A controlling method of a display apparatus including a processor, a display, and a storage, the method comprising:
displaying a drawing image provided by an electronic blackboard function;
based on a first input image being received from an external device, via wireless communication, that is external to the display apparatus, displaying the input image on a first area of the drawing image;
in response to receiving a user input for drawing a continuous line across between the drawing image and the first input image being detected through a touch sensor, drawing the continuous line on the drawing image and the first input image; and displaying, on a second area of the drawing image while displaying the first input image on the first area, a menu for controlling the external device to transmit a second input image different from the first input image.

9. The method as claimed in claim 8, wherein the displaying the first input image comprises:

adjusting a transparency of the first area of the drawing image that overlaps the first input image; and providing the drawing image of which the transparency of the first area is adjusted.

10. The method as claimed in claim 8, wherein the electronic blackboard function includes at least one of a handwriting input function, an editing function, a video play function, and a function of storing a screen where handwriting is input.

11. The method as claimed in claim 10, further comprising:

based on the first input image received from the external device being displayed on the first area of the drawing image, inactivating the video play function that is previously activated on the screen.

12. The method as claimed in claim 11, wherein the inactivating comprises, based on the first input image from the external device including an audio signal, inactivating the video play function that is previously activated on the screen.

13. The method as claimed in claim 8, wherein the displaying the first input image comprises displaying the first input image from the external device in a form of at least one of Picture In Picture (PIP) and Picture By Picture (PBP).

14. The method as claimed in claim 8, wherein the displaying the first input image comprises displaying the first input image received from a first external device on the first area of the drawing image, and displaying the second input image received from a second external device on a remaining area of the drawing image.

\* \* \* \* \*